(No Model)
M. L. DEERING.
PNEUMATIC TIRE.
No. 583,280. Patented May 25, 1897.
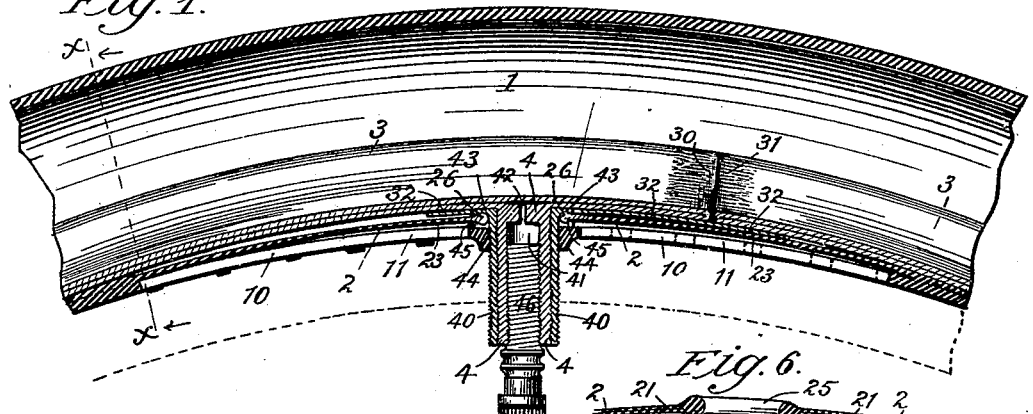
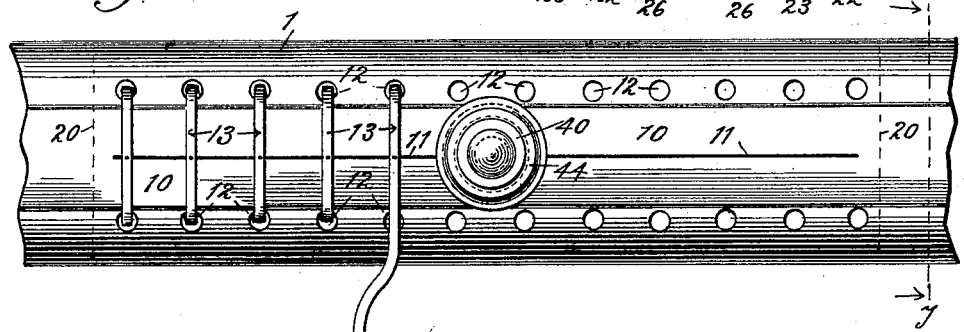
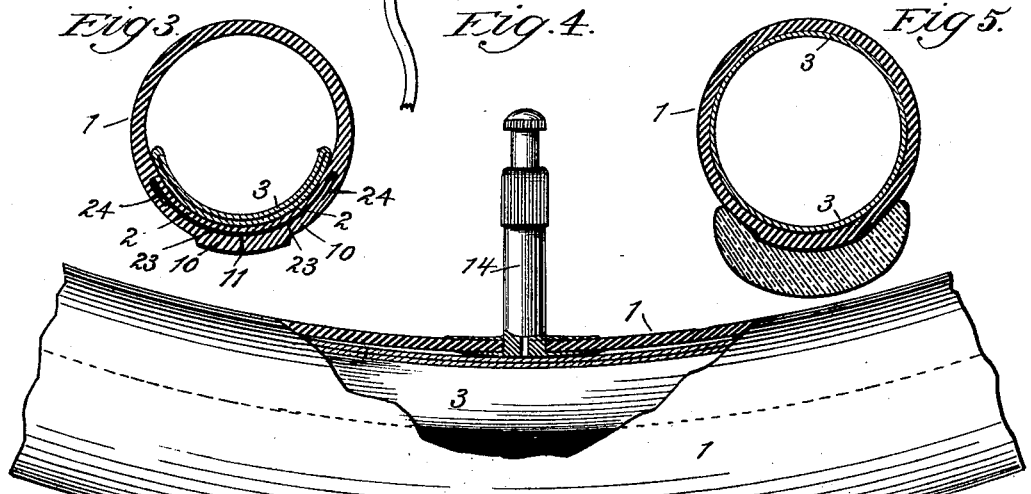
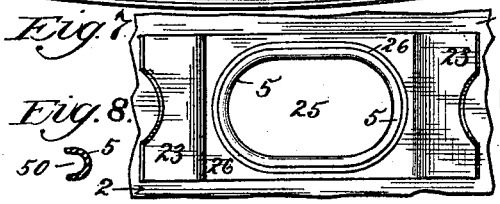
WITNESSES:
Edgar C. Rowland.
Arthur F. Thompson.
INVENTOR
Mark L. Deering.
BY
Daniel A. Carpenter,
ATTORNEY

UNITED STATES PATENT OFFICE.

MARK L. DEERING, OF BROOKLYN, NEW YORK.

PNEUMATIC TIRE.

SPECIFICATION forming part of Letters Patent No. 583,280, dated May 25, 1897.

Application filed September 17, 1896. Serial No. 606,107. (No model.)

*To all whom it may concern:*

Be it known that I, MARK L. DEERING, of Brooklyn, in the county of Kings and State of New York, have invented a certain new and useful Improvement in Pneumatic Tires, of which the following is a full, clear, and exact description, reference being made to the accompanying drawings, forming part of this specification.

This invention relates to improvements in the construction of pneumatic tires for the wheels of velocipedes and other vehicles and in the combination therewith of mechanical devices adapted to facilitate the repair of an inner inflatable tube which is inclosed for use in an outer endless inflatable tube; and the invention consists of a tire comprising an endless inflatable tube having an aperture therein adapted to form a passage for an inner tube, in combination with an inner tube which is adapted to be drawn out of and into said endless tube and with means whereby the aperture in the endless tube is hermetically closed, also in combination with an independent device adapted to hermetically close the aperture, substantially as herein described and claimed.

On the accompanying sheet of drawings, Figure 1 is a longitudinal section of a fragment of the improved tire through the valve-post of the inner tube; Fig. 2, a plan of the same fragment inverted; Fig. 3, a cross-section in the plane $x\ x$, Fig. 1, viewed in the direction indicated by the arrows; Fig. 4, a side view and section of another fragment together with the valve of the outer tube; Fig. 5, a cross-section in the plane $y\ y$, Fig. 2, viewed in the direction indicated by the arrows; Fig. 6, a section through the wall of the outer tube on the diameter of the above-mentioned aperture; Fig. 7, a plan of that aperture expanded and of a stay engaging the margin of the aperture, and Fig. 8 a cross-section of the stay.

Similar reference-numerals designate like parts in the different views.

The principal object of this invention is to render it convenient to remove from a pneumatic tire composed, essentially, of a single tube and to reinsert therein an extra tube adapted to be separately inflated and to enable the aperture through which the inner tube is passed to be hermetically and firmly closed in a few seconds, even by a person who is not skilled in the construction or repair of tires. The extra tube is not expected to perform its main function nor even to be inflated unless the single-tube tire is injured. If this tire is punctured, for instance, then the inner tube, on being inflated, and the punctured outer tube form together another perfect tire; but the invention applies also to those tires of which the type is a tire comprising two thin tubes, one of them being endless and inclosing the other, and an uninflatable case inclosing the thin tubes, as will appear from the following description and claims.

The single-tube tire comprised in the invention is the tire 1 of the drawings. It differs in construction from an ordinary tire known by that name only in the portion which borders upon and lies near the aperture previously mentioned. The wall of this portion of the tire is composed of two parts. The outer part 10 is a continuation of the wall proper of the tire, and in this part is an opening which affords access to the inner part 2 and which is large enough to allow an inner tube and its valve-post to be freely passed through the part 10. A suitable opening is that indicated in the drawings, it being a round hole adapted to receive the valve-post of the inner tube, with slits 11 extending from this hole toward the ends of the part 10. On each side of the slits 11 are perforations 12, in which is a lace 13. If an opening of another form is made, means should be provided whereby the opening may be closed, except where the valve-post is to pass through the part 10. The other or inner part 2 consists of a diaphragm which intersects the part 10 in a line surrounding the opening therein, above mentioned, and any other perforation made in that part and which is hermetically joined to the part 10 and the main part of the tire at all points of its intersection therewith and which has in it the aforesaid aperture adapted to form a passage for an inner tube through the diaphragm. The intersection of the diaphragm with the other parts of the tire is shown in Figs. 1 and 3 and indicated by the dotted lines 20 on Fig. 2. This diaphragm and the other parts of the tire are preferably formed and vulcanized together. Whether the diaphragm is composed wholly or partly of a single thickness of material or of two layers of rubber united or of a layer or layers of rubber and a layer of fabric united the term "diaphragm" 2 is intended to designate it and is used in the claims with the meaning here ascribed to that term. Although the diaphragm 2 may be composed of a single thickness of rubber, it is better if it is composed of two layers 21 and 22, vulcanized together with the grain of one layer transverse to that of the other, and still better if it comprises also a layer of fabric 23, firmly secured to the rubber, except near the aperture, where it is unattached to the rubber and constituting the greater part of the outer surface of the diaphragm. The fabric 23, which is represented in Fig. 3 by the heavy black line, is folded along the lines where it meets the sides of the part 10, and portions 24 of the fabric are secured to the inner surface of that part, as appears by Fig. 3. The diaphragm and the part 10 are unattached to one another except at their intersection, as above described. The aperture 25 in the diaphragm is preferably bounded by a ring of rubber which is thicker than the main part of the diaphragm. This ring may have either flat or curved faces, but the preferred form is that of the ring 26. (Best shown in Fig. 6.)

The arrangement of the inner tube 3 within the tire 1, the tube 3 being uninflated, is illustrated by Figs. 1, 3, and 4. This tube is naturally straight, its ends 30 and 31 being hermetically sealed, and it has secured to it near the end 30 a cylindrical projection which contains a valve and which forms a plug that fills the aperture in the diaphragm 2. The particular projection or valve-post shown comprises the rubber post 4 and the metal tube 40. The post 4 is vulcanized on the tube 3, near the end 30, and has in it a cylindrical recess 41 and an air-passage 42, extending from the recess 41 to the interior of the tube 3. The metal tube 40 has a flange 43 at its base and is threaded both internally and externally and is screwed tightly on the rubber post, the flange 43 being in contact with the wall of the tube 3. The interior of the metal tube might be smooth and the rubber post might be vulcanized in the tube. In that face of the flange 43 which is next to the diaphragm 2 is an annular groove, and on the tube 40 is a nut 44 and a washer 45, the washer also having in it an annular groove facing that in the flange 43. The ring 26 on the diaphragm 2 is clamped by the nut 44 between the washer 45 and the flange 43 and pressed tightly into the groove in the flange and around the valve-post close to the flange. A cylindrical threaded valve-case 46, tightly screwed into the recess 41 in the rubber post, renders air-tight the contact of the tube 40 with the exterior of the post 4, as well as that of the valve-case with the interior of the post. Thus the aperture is hermetically closed, so that air cannot escape from the tire 1 around the valve-post of the tube 3. A band 32, secured to the tube 3 near the end 31, extends therefrom to and around the valve-post, holding the tube 3 close to that part of the wall of the tire 1 which rests against the rim of the wheel. This valve-post extends through the round hole which forms part of the opening above mentioned in the part 10 of the tire 1, the rest of that opening being closed and the sections of the part 10 being secured together by the lacing or other means provided therefor, and when the tire is affixed to a wheel this valve-post and the valve-post 14 of the tire 1 extend through holes diametrically opposite to each other in the rim of the wheel.

The tube 3 being secured in the tire 1, as described, it is easy to remove it from and reinsert it in the tire through the aperture 25 and then hermetically reclose the aperture. The tire being off the rim of the wheel and being deflated the sections of the part 10 are released from their fastenings and separated, the nut 44 and washer 45 are removed from the valve-post, and the valve-post is pushed through the aperture 25 into the interior of the tire 1. Then the aperture 25 is converted into a passage for the tube 3 by distending its margin and engaging therewith the stay previously mentioned. This is a contrivance by which the expansion of the aperture is temporarily maintained. The preferred form of the stay is that of a flattened ring 5, of metal or other rigid material, having a peripheral groove 50 therein, and this ring engages the distended margin of the aperture 25 in the groove 50, as appears by Fig. 7, and renders the aperture large enough to form a passage for the tube 3. Through this enlarged aperture the tube 3 is readily withdrawn from and replaced in the tire 1. When the tube 3 is again within the tire 1, the end 31 of the tube is connected with the valve-post by the band 32, which is provided with an eye through which the post passes, the stay 5 is disengaged from the margin of the aperture 25, whereupon the aperture is contracted, the margin of the aperture is then clamped around the valve-post, as above explained, and finally the sections of the part 10 are fastened together, covering the diaphragm. The part 10, it will be seen, is adapted to reinforce the diaphragm 2 when either the tire 1 or the tube 3 is inflated.

The thickened margin of the aperture 25 is useful not only to help render tight the connection of the diaphragm to the valve-post of the inner tube, but also to help prevent the diaphragm being torn when the aperture is expanded; and the reason why the diaphragm is preferably formed of two layers of rubber, with the grain of one layer transverse to that passage, when it is expanded, through which an inner tube may be inserted in and withdrawn from the outer tube, in combination with a removable closing device adapted to engage the wall of said endless tube around the aperture therein, when the aperture is contracted, and to hermetically close said aperture, substantially as described.

8. A pneumatic tire comprising an endless inflatable tube having an expansible aperture therein of the proper normal size to closely encircle the valve-post of an inner tube and adapted to form a passage for the inner tube when the aperture is expanded, in combination with a removable closing device adapted to hermetically close the aperture, substantially as described.

9. A pneumatic tire comprising an endless inflatable tube having an expansible aperture therein adapted to form a passage for an inner tube, the part of the tube surrounding and adjacent to the aperture comprising two layers of rubber, with the grain of one layer transverse to that of the other, in combination with a removable closing device adapted to hermetically close the aperture, substantially as described.

10. A pneumatic tire comprising an endless inflatable tube having an expansible aperture therein adapted to form a passage for an inner tube, the aperture being surrounded by a layer of fabric firmly secured to the rubber of the tube excepting near the aperture where the fabric is unattached to the rubber, in combination with a removable closing device adapted to hermetically close the aperture, substantially as described.

11. A pneumatic tire comprising an endless inflatable tube having an expansible aperture therein adapted to form a passage for an inner tube to and from the interior of the endless tube, the aperture being surrounded by thin rubber and by a thickened rubber margin formed on the thin rubber, in combination with a removable mechanical closing device adapted to engage the wall of said endless tube around the aperture therein and to hermetically close the aperture, substantially as described.

12. A pneumatic tire comprising an endless inflatable tube having an expansible aperture therein surrounded by thin rubber and by a thickened rubber margin formed on the thin rubber, in combination with a post or plug having a flange at its base and a nut and washer on the post, the flange and washer being provided with annular grooves, substantially as described.

13. A pneumatic tire comprising an endless inflatable tube having an expansible aperture therein adapted to form a passage for an inner tube to and from the interior of the endless tube, the aperture being bounded by a ring 26, in combination with a removable mechanical closing device adapted to engage the wall of said endless tube around the aperture therein and to hermetically close the aperture, substantially as described.

14. A pneumatic tire comprising an endless inflatable tube having an expansible aperture therein bounded by a ring 26, in combination with a post or plug having at its base a flange with a groove therein extending around the post, and a nut and washer on the post the washer being provided with a similar groove, substantially as described.

15. A pneumatic single-tube tire comprising a diaphragm 2 hermetically joined at all points along its margin to the wall of the tire and having in it an aperture, in combination with an outer part 10 having an opening therein and unattached to the diaphragm except along their margins, and a removable closing device adapted to hermetically close the aperture in the diaphragm, substantially as described.

16. A pneumatic single-tube tire comprising a diaphragm 2 hermetically joined at all points along its margin to the wall of the tire, the diaphragm comprising two layers of rubber, with the grain of one layer transverse to that of the other, and having in it an expansible aperture, in combination with an outer part 10 having an opening therein and unattached to the diaphragm except along their margins, and a removable closing device adapted to hermetically close the aperture in the diaphragm, substantially as described.

17. A pneumatic single-tube tire comprising a diaphragm 2 hermetically joined at all points along its margin to the wall of the tire, the diaphragm comprising a layer of rubber and a layer of fabric and having an expansible aperture therein, the fabric being firmly secured to the rubber excepting near the aperture where it is unattached to the rubber and being secured with the rubber to the wall of the tire, in combination with an outer part 10 having an opening therein and unattached to the diaphragm except along their margins, and a closing device adapted to hermetically close the aperture in the diaphragm, substantially as described.

18. A pneumatic single-tube tire comprising a diaphragm 2 hermetically joined at all points along its margin to the wall of the tire, the diaphragm comprising an inner layer of rubber and an outer layer of fabric and having an expansible aperture therein, the fabric being firmly secured to the rubber excepting near the aperture where it is unattached to the rubber, in combination with an outer part 10 having an opening therein and unattached to the diaphragm except along their margins, and a closing device adapted to hermetically close the aperture in the diaphragm, the fabric of the diaphragm being folded along the lines where it meets the sides of the part 10, and portions 24 of the fabric being secured to the inner surface of the part 10, substantially as described.

19. A pneumatic single-tube tire comprisof the other, or of rubber and fabric, is that it is then less liable to be ruptured or torn at the aperture than it is when it comprises but a single layer of rubber. Moreover, the fabric 23 renders the union of the diaphragm and part 10 secure even when the sections of the part 10 are spread widely apart, and it protects the rubber of the diaphragm against injury by the lace 13 or whatever fastening may be used to keep the sections of the part 10 close together.

If the tire 1 is punctured and the tube 3 inflated, then the punctured single-tube tire is utilized until it is repaired merely as a case, inclosing an inflated tube, as represented in Fig. 5. It is to be observed that the tire 1 would be serviceable without the tube 3 to the same extent as is an ordinary single-tube tire, provided the aperture 25 was closed either by the closing device above described, which constitutes also a valve-post, or by a similar closing device not containing a valve—such, for example, as would be produced by replacing the rubber post 4 with a solid post—so that if the tire 1 is provided with an independent closing device adapted to hermetically close the aperture 25 it may be used either alone or with the tube 3 inclosed therein at pleasure.

The invention also includes a tire comprising an uninflatable case, inclosing an endless inflatable thin rubber tube provided with an aperture—such as the aperture 25, for example—adapted to form a passage for an inner tube to and from the interior of the endless tube, in combination with a closing device adapted to hermetically close the aperture, the endless tube and the case inclosing it being together capable of supplying the place of the single-tube tire 1. The thin endless tube may be strengthened around the aperture by an extra layer of thin rubber having its grain transverse to that of the wall proper of the tube, or by a layer of fabric, or by layers of rubber and fabric together, and the margin of the aperture may be made thicker than the wall of the tube, substantially as explained in the description of the diaphragm 2.

Having thus described my invention, what I claim as new, and desire to secure by Letters Patent, is—

1. A pneumatic tire comprising the combination of an outer endless inflatable tube having an aperture in the wall thereof, an inner inflatable tube 3, which is adapted to be drawn by one end out of and into said outer tube, and a mechanical fastening composed of a post, fixed to the tube 3 and extending from the exterior of that tube through said aperture in the endless tube, and of a rigid counterpart whereby an air-tight connection is made between the post and the endless tube, substantially as described.

2. A pnuematic tire comprising the combination of an outer endless inflatable tube having an aperture in the wall thereof, an inner inflatable tube 3, which is adapted to be drawn by one end out of and into said outer tube, and a mechanical fastening composed of a post, fixed to the tube 3 and extending from the exterior of that tube through said aperture in the endless tube, and of means constituting with the post a screw-clamp which engages the margin of said aperture, the clamp forming an air-tight connection between the endless tube and the post, substantially as described.

3. A pnuematic tire comprising the combination of an outer endless inflatable tube having an aperture in the wall thereof, an inner inflatable tube 3, which is adapted to be drawn by one end out of and into said outer tube, and a mechanical fastening composed of a post, fixed to the tube 3 and extending from the exterior of that tube through said aperture in the endless tube, a rigid flange or collar on the post between the tube 3 and the endless tube, and a nut whereby the margin of said aperture is hermetically clamped between said flange or collar and the nut, substantially as described.

4. A pneumatic tire comprising the single-tube tire 1, having the diaphragm 2 and the outer part 10, the diaphragm having in it an aperture, and the part 10 an opening, adapted to form a passage for an extra tube to and from the interior of the single-tube tire, in combination with an inner tube on which is a projection extending through said aperture and opening, and having in it a recess for a valve in communication with the interior of the inner tube, and having on it a device adapted to hermetically close the aperture in the diaphragm, substantially as described.

5. A pneumatic tire comprising an outer, endless, inflatable tube, having an expansible aperture in the wall thereof adapted to form a passage, when it is expanded, through which an inner tube may be inserted in and withdrawn from the outer tube, in combination with an inner inflatable tube, provided with a projection extending through the aperture in the wall of the outer tube and having in it a valve with an air-passage between the valve and the interior of the inner tube, and having on it a device adapted to engage the wall of the outer tube around the aperture therein, when the aperture is contracted, and to be disengaged therefrom, and to hermetically close said aperture, substantially as described.

6. A pneumatic tire comprising an endless inflatable tube having the expansible aperture 25 therein, in combination with an inner tube provided with the tubular rubber post 4, the metal tube 40 threaded both internally and externally and having a flange 43 at its base, a nut and washer on the tube 40, and a valve-case tightly secured in the tubular post 4, substantially as described.

7. A pneumatic tire comprising an endless, inflatable tube, having an expansible aperture in the wall thereof adapted to form a ing a diaphragm 2 hermetically joined at all points along its margin to the wall of the tire and having in it an aperture, in combination with an outer part 10 having a hole and slits 11 therein and unattached to the diaphragm except along their margins and provided with perforations 12 and a lace 13, the hole in the part 10 and the aperture in the diaphragm being in the relative positions in which they are shown, and a removable closing device adapted to hermetically close the aperture in the diaphragm, substantially as described.

MARK L. DEERING.

In presence of—
CHAS. COLEMAN MILLER,
ARTHUR F. THOMPSON.